US007600116B2

(12) United States Patent
Bajko et al.

(10) Patent No.: US 7,600,116 B2
(45) Date of Patent: Oct. 6, 2009

(54) AUTHENTICATION OF MESSAGES IN A COMMUNICATION SYSTEM

(75) Inventors: Gabor Bajko, Budapest (HU); Krisztian Kiss, Tampere (FI)

(73) Assignee: Nokia Corporation, Espoo (FI)

( * ) Notice: Subject to any disclaimer, the term of this patent is extended or adjusted under 35 U.S.C. 154(b) by 658 days.

(21) Appl. No.: 10/760,521

(22) Filed: Jan. 21, 2004

(65) Prior Publication Data

US 2005/0097363 A1 May 5, 2005

(30) Foreign Application Priority Data

Oct. 17, 2003 (GB) ................................. 0324364.9

(51) Int. Cl.
*H04L 9/00* (2006.01)
(52) U.S. Cl. ....................................... 713/166; 709/226
(58) Field of Classification Search ................. 713/166; 709/228
See application file for complete search history.

(56) References Cited

U.S. PATENT DOCUMENTS

| 5,642,401 | A  | * | 6/1997  | Yahagi ........................ 455/411 |
| 6,621,793 | B2 | * | 9/2003  | Widegren et al. ......... 370/230.1 |
| 7,082,118 | B1 | * | 7/2006  | Sethi ........................... 370/349 |
| 7,136,635 | B1 | * | 11/2006 | Bharatia et al. ........... 455/422.1 |
| 7,219,223 | B1 | * | 5/2007  | Bacchus et al. ............. 713/150 |
| 2002/0012433 | A1 | * | 1/2002  | Haverinen et al. .......... 380/247 |
| 2002/0142749 | A1 | * | 10/2002 | Muniere et al. ............. 455/403 |
| 2003/0005280 | A1 | * | 1/2003  | Bobde et al. ................. 713/150 |
| 2004/0121760 | A1 | * | 6/2004  | Westman et al. ............ 455/411 |
| 2004/0210766 | A1 | * | 10/2004 | Kroselberg ................. 713/201 |

OTHER PUBLICATIONS

K. Boman, G. Horn, P. Howard, and V. Niemi; UMTS security, Oct. 2002, Electronics & Communications Engineering Journal, p. 191-204.*
3GPP TS 33.102 v5.1.0, 3rd, Generation Partnership Project, (Release 5), Dec. 2002.*
RFC 3329, Arkko, J. et al., "Security Mechanism Agreement for the Session Initiation Protocol (SIP)", Jan. 2003, pp. 1-21.
RFC 2617, Franks, J. et al., "HTTP Authentication: Basic and Digest Access Authentication", Jun. 1999, pp. 1-29.

* cited by examiner

*Primary Examiner*—Kambiz Zand
*Assistant Examiner*—James Turchen
(74) *Attorney, Agent, or Firm*—Harrington & Smith, PC

(57) ABSTRACT

In a communication system wherein a serving controller may be configured to support a first security mechanism and at least one other security mechanism. A request for registration is sent from a user equipment to the serving controller where after it is determined in a second controller that the user equipment supports another security mechanism than the first security mechanism. The second controller may then send to the serving controller an indication that another security mechanism than the first security mechanism is used by the user equipment. The serving controller then sends a challenge in accordance with the other security mechanism to the user equipment.

38 Claims, 3 Drawing Sheets

AUTHENTICATION OF MESSAGES IN A COMMUNICATION SYSTEM

The present invention relates to communication systems, and in particular, to authentication of messages in a communication system. The messages to be authenticated may comprise, for example, requests for services.

A communication system can be seen as a facility that enables communication sessions between two or more entities such as user equipment and/or other nodes associated with the communication system. The communication may comprise, for example, communication of voice, data, multimedia and so on. A user equipment may, for example, be provided with a two-way telephone call or multi-way conference call. A user equipment may also be provided with a connection to an application server (AS), for example a service provider server, thus enabling use of services provided by the application server.

A communication system typically operates in accordance with a given standard or specification which sets out what the various entities associated with the communication system are permitted to do and how that should be achieved. For example, the standard or specification may define if the user, or more precisely, user equipment is provided with a circuit switched service and/or a packet switched service. Communication protocols and/or parameters which shall be used for the connection may also be defined. In other words, a specific set of "rules" on which the communication can be based on needs to be defined to enable communication by means of the system.

Communication systems proving wireless communication for user equipment are known. An example of the wireless systems is the public land mobile network (PLMN). The PLMNs are typically based on cellular technology. In cellular systems, a base transceiver station (BTS) or similar access entity serves wireless user equipment (UE) known also as mobile stations (MS) via a wireless interface between these entities. The communication on the wireless interface between the user equipment and the elements of the communication network can be based on an appropriate communication protocol. The operation of the base station apparatus and other apparatus required for the communication can be controlled by one or several control entities. The various control entities may be interconnected.

One or more gateway nodes may also be provided for connecting the mobile network to other networks, for example to a public switched telephone network (PSTN) and/or other communication networks such as an IP (Internet Protocol) and/or other packet switched data networks. For example, if a requested service is provided by a service provider located in other network, the service request is routed via the mobile network to the other network and then to the service provider.

An example of the services that may be offered for users such as the subscribers to a communication system is the so called multimedia services. An example of the communication systems enabled to offer multimedia services is the Internet Protocol (IP) Multimedia network. IP Multimedia (IM) functionalities can be provided by means of a IP Multimedia Core Network (CN) subsystem, or briefly IP Multimedia subsystem (IMS). The IMS includes various network entities for the provision of the multimedia services.

The third generation partnership project (3GPP) has defined use of the general packet radio service (GPRS) as a backbone communication system for the provision of the IMS services. Therefore the GPRS will be used in this specification as an example of a possible backbone communication system enabling the multimedia services. The Third Generation Partnership Project (3GPP) has also defined a reference architecture for the third generation (3G) core network which will provide the users of user equipment with access to the multimedia services. This core network is divided into three principal domains. These are the Circuit Switched (CS) domain, the Packet Switched (PS) domain and the Internet Protocol Multimedia (IM) domain.

The latter of these, the IM domain, is for ensuring that multimedia services are adequately managed. The 3G IM domain supports the Session Initiation Protocol (SIP) as developed by the Internet Engineering Task Force (IETF). Session Initiation Protocol (SIP) is an application-layer control protocol for creating, modifying and terminating sessions with one or more participants (endpoints).

It is expected that various types of services are to be provided by means of different Application Servers (AS) over IMS systems. For the services it may not be enough just to rely on the assumption that the user equipment or any other node in communication with the application server is genuine and can be trusted as being who the user thereof tells to be. Therefore some kind of data security mechanism is typically used when providing services over the communication system.

Data security can be provided by means of integrity protection and ciphering. The purpose of these functions is to shield data so that unauthorized users cannot modify or read the data. Another security mechanism is known as authentication. The authentication can be used for verifying that the authenticity of data, for example, that the data is correct and comes from appropriate source. Authentication may be required, for example, for securing data and the integrity of a user against attacks during transportation of data over a data network. Other examples include authentication for preventing non-authorised users from accessing data that is stored in a database and authentication for preventing unauthorised use of services.

For example, in certain applications arranged in accordance with the third generation partnership project (3GPP) it may be necessary for a user equipment wishing to connect to the IMS to be able to support IMS Authentication and Key Agreement (AKA) for authentication and Secure Internet Protocol (IPSec) for integrity protection. The present 3GPP security agreement mechanism assumes that a client, when initiating the security agreement mechanism, will send a Security-Client header in the SIP request including a listing of the supported security mechanisms. In case the list does not contain an indication that the 3GPP IPsec is supported, then the registration with the IMS will not be allowed to proceed. A user equipment that does not support the IPSec may thus not be able to use the IMS services. This problem is not limited to 3GPP environments, but may occur in other communications systems as well. There is therefore a need for providing a way of registering even in instances wherein alterative security mechanisms are supported by the user equipment.

Embodiments of the present invention aim to address one or several of the above problems.

According to one embodiment of the present invention, there is provided a method in a communication system wherein a serving controller is configured to support a first security mechanism and at least one other security mechanism. The method comprises the steps of sending a request for registration from a user equipment to the serving controller, determining, based on the request, in a second controller that the user equipment supports another security mechanism than the first security mechanism, sending from the second controller to the serving controller an indication that another security mechanism than the first security mechanism is used by the user equipment, and sending a challenge in accordance with the other security mechanism from the serving controller to the user equipment.

According to another embodiment there is provided a communication system comprising a serving controller configured to accept registrations of user equipments and to support at least two different security mechanisms, and means for providing the serving controller with information regarding the security mechanism supported by a user equipment that has requested for registration to the serving controller. The serving controller is configured to send a challenge in accordance with the determined security mechanisms to the user equipment and to authenticate a message from the user equipment based on a response to the challenge included in the message.

According to another embodiment of the present invention there is provided a proxy controller for a communication system. The proxy controller is configured to forward registrations of user equipments to a serving controller, to determine the security mechanism supported by a user equipment that has requested for registration to the serving controller, and to signal information to the serving controller regarding the security mechanism supported by the user equipment.

In a more specific form a response to the challenge may be included in a message from the user equipment to the serving controller. The response may be used for authentication of the message at the serving controller.

The second controller may comprise a network entity providing proxy call state control functions between the user equipment and the serving controller.

Embodiments may provide a way of enabling use of a security mechanism that is an alternative for the default security mechanism of a serving controller. For example, instead of using IPSec, authentication may be based on the HTTP Digest in the 3GPP architecture. Thus an alternative and/or additional security mechanism may be provided for users wishing to register to a communication system providing e.g. multimedia services. Therefore, for example, IMS services may be made available to a larger variety of user equipment that in the prior art arrangements.

For better understanding of the present invention, reference will now be made by way of example to the accompanying drawings in which.

Certain embodiments of the present invention will be described in the following by way of example, with reference to the exemplifying architecture of a third generation (3G) mobile communications system. However, it shall be appreciated that the embodiments may be applied to any suitable communication system.

Figure 1:
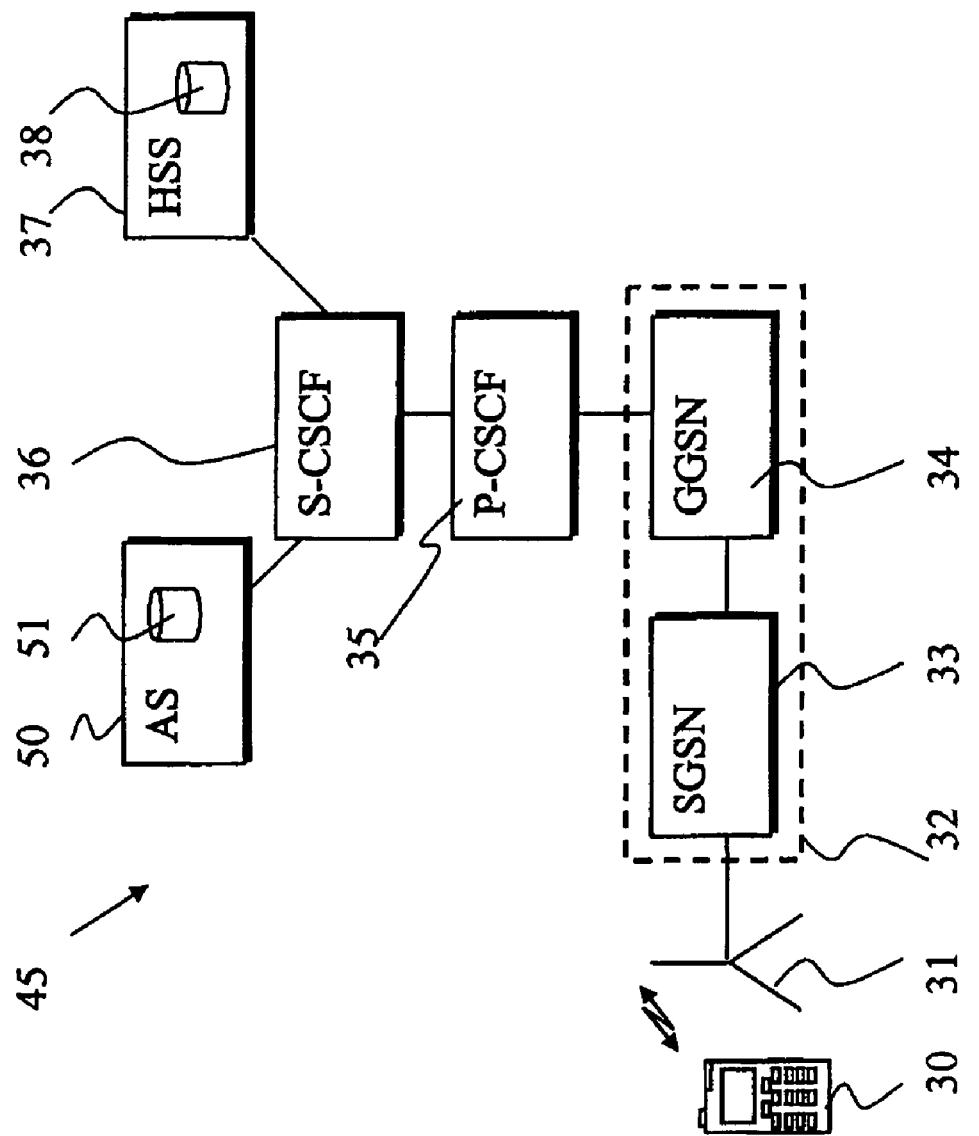
FIG. 1 shows one embodiment of the invention.

Reference is made to FIG. 1 which shows an example of a network architecture wherein the invention may be embodied. In FIG. 1 an IP Multimedia Network 45 is provided for offering IP multimedia services for IP Multimedia Network subscribers.

As described above, IP Multimedia (IM) functionalities can be provided by means of a mobile communication system. A mobile communication system is typically arranged to serve a plurality of mobile user equipment usually via a wireless interface between the user equipment and at least one base station of the communication system. The mobile communication system may logically be divided between a radio access network (RAN) and a core network (CN).

In the system base station 31 is arranged to transmit signals to and receive signals from mobile user equipment 30 of a mobile user i.e. subscriber via a wireless interface between the user equipment and the radio access network. Correspondingly, the mobile user equipment is able to transmit signals to and receive signals from the radio access network via the wireless interface.

In the shown arrangement the user equipment 30 may access the IMS network 45 via the access network associated with base station 31, respectively. It shall be appreciated that, although, for clarity reasons FIG. 1 shows a base station of only one radio access network, a typical communication network system usually includes a number of radio access networks.

The 3G radio access network (RAN) is typically controlled by appropriate radio network controller (RNC). This controller is not shown in order to enhance clarity. A controller may be assigned for each base station or a controller can control a plurality of base stations, for example in the radio access network level. It shall thus be appreciated that the name, location and number of the network controllers depends on the system.

The mobile user equipment 30 may comprise any appropriate mobile user equipment adapted for Internet Protocol (IP) communication to connect the network. For example, the mobile user may access the cellular network by means of a Personal computer (PC), Personal Data Assistant (PDA), mobile station (MS) and so on. The following examples are described in the context of mobile stations.

One skilled in the art is familiar with the features and operation of a typical mobile station. Thus, it is sufficient to note that the user may use a mobile station for tasks such as for making and receiving phone calls, for receiving and sending data from and to the network and for experiencing multimedia content or otherwise using multimedia services. A mobile station may include an antenna for wirelessly receiving and transmitting signals from and to base stations of the mobile communication network. A mobile station may also be provided with a display for displaying images and other graphical information for the user of the mobile user equipment. Camera means may be provided for capturing still or video images. Speaker means are also typically provided. The operation of a mobile station may be controlled by means of an appropriate user interface such as control buttons, voice commands and so on. Furthermore, a mobile station is provided with a processor entity and a memory means.

It shall be appreciated that although only one mobile station is shown in FIG. 1 for clarity, a number of mobile stations may be in simultaneous communication with base stations of a mobile communication system.

The core network (CN) entities typically include various switching and other control entities and gateways for enabling the communication via a number of radio access networks and also for interfacing a single communication system with one or more communication system such as with other cellular systems and/or fixed line communication systems. In the 3GPP systems the radio access network controller is typically connected to an appropriate core network entity or entities such as, but not limited to, a serving general packet radio service support node (SGSN) 33. The radio access network controller is in communication with the serving GPRS support node via an appropriate interface, for example on an Iu interface. Although not shown, the SGSN typically has access to designated subscriber database configured for storing information associated with the subscription of the respective user equipment.

The serving GPRS support node, in turn, typically communicates with a gateway GPRS support node via the GPRS backbone network 32. This interface is commonly a switched packet data interface.

In a 3GPP network, a packet data session is established to carry traffic flows over the network. Such a packet data session is often referred as a packet data protocol (PDP) context. A PDP context may include a radio bearer provided between the user equipment and the radio network controller, a radio access bearer provided between the user equipment, the radio network controller and the SGSN, and switched packet data channels provided between the serving GPRS service node and the gateway GPRS service node. Each PDP context usually provides a communication pathway between a particular user equipment and the gateway GPRS support node and, once established, can typically carry multiple flows. Each flow normally represents, for example, a particular service and/or a media component of a particular service. The PDP context therefore often represents a logical communication pathway for one or more flow across the network. To implement the PDP context between user equipment and the serving GPRS support node, radio access bearers (RAB) need to be established which commonly allow for data transfer for the user equipment. The implementation of these logical and physical channels is known to those skilled in the art and is therefore not discussed further herein.

FIG. 1 show an application server 50. The user equipment 30 may connect, via the GPRS network, to the application server that is connected to one or more data networks such as, but not limited to, the exemplifying Internet Protocol (IP) network. It shall be appreciated that a great number of application servers may be connected to each data network.

The communication systems have developed in the direction wherein services are provided for the user equipment by means of various functions of the data network that are handled by controller entities, such as servers. For example, in the current third generation (3G) wireless multimedia network architectures it is assumed that several different servers providing various control functions are used for the service provision control. These include functions such as the call session control functions (CSCFs). The call session functions may be divided into various categories such as a proxy call session control function (P-CSCF), interrogating call session control function (I-CSCF), and serving call session control function (S-CSCF). It shall be appreciated that similar functions may be referred to in different systems with different names. For example, in certain applications the CSCFs may be referenced to as the call state control functions.

A user who wishes to use services provided by an application server via the IMS system may need first to register with a serving controller, such as the serving call session control function (S-CSCF) 36. As shown in FIG. 1, communication between the S-CSCF 36 and the user equipment 30 may be routed via at least one proxy call session control function (P-CSCF) 35. The proxy CSCF 35 is thus for proxying messages from the GGSN 34 to a serving call session control function 36. The serving controller, i.e. CSCF 36 in FIG. 1, in turn, provides the control entity the user equipment 30 needs to be registered with. The registration is required to enable the user equipment to request for a service from the communication system.

The system of FIG. 1 is further arranged such that a user who has been provided with required communication resources by the backbone network and is registered to the serving controller 36 has to initiate the use of services offered by the application server 50 by sending a request for the desired service to the serving controller over the communication system.

A user information storage entity may also be provided for storing subscriber i.e. user related information. In the particular embodiment the storage entity is shown to be provided by means of a home subscriber server (HSS) 37. The home subscriber server (HSS) 37 can be queried by other function entities over the appropriate interfaces, e.g. during session set-up procedures and later. The subscriber information may include information such as data required for authentication purposes (e.g. registration identities of the subscriber or the terminals) and so on. The HSS 37 can also be used for storing permanently subscriber profile information.

The embodiments are based on the realisation that it might be advantageous if, in addition or as an alternative to the IMS Authentication and Key Agreement (AKA), the home IMS network is configured to support some further security mechanisms for serving subscribers whose user equipment do not support the IPSec.

In the shown example the serving controller 36 is configured to support a first or default security mechanism and at least one other security mechanism. In the herein described detailed example the S-CSCF 36 is configured to support IPsec as a default security mechanism and Hypertext Transport Protocol Digest (HTTP Digest) as a secondary security mechanism.

Figure 2:
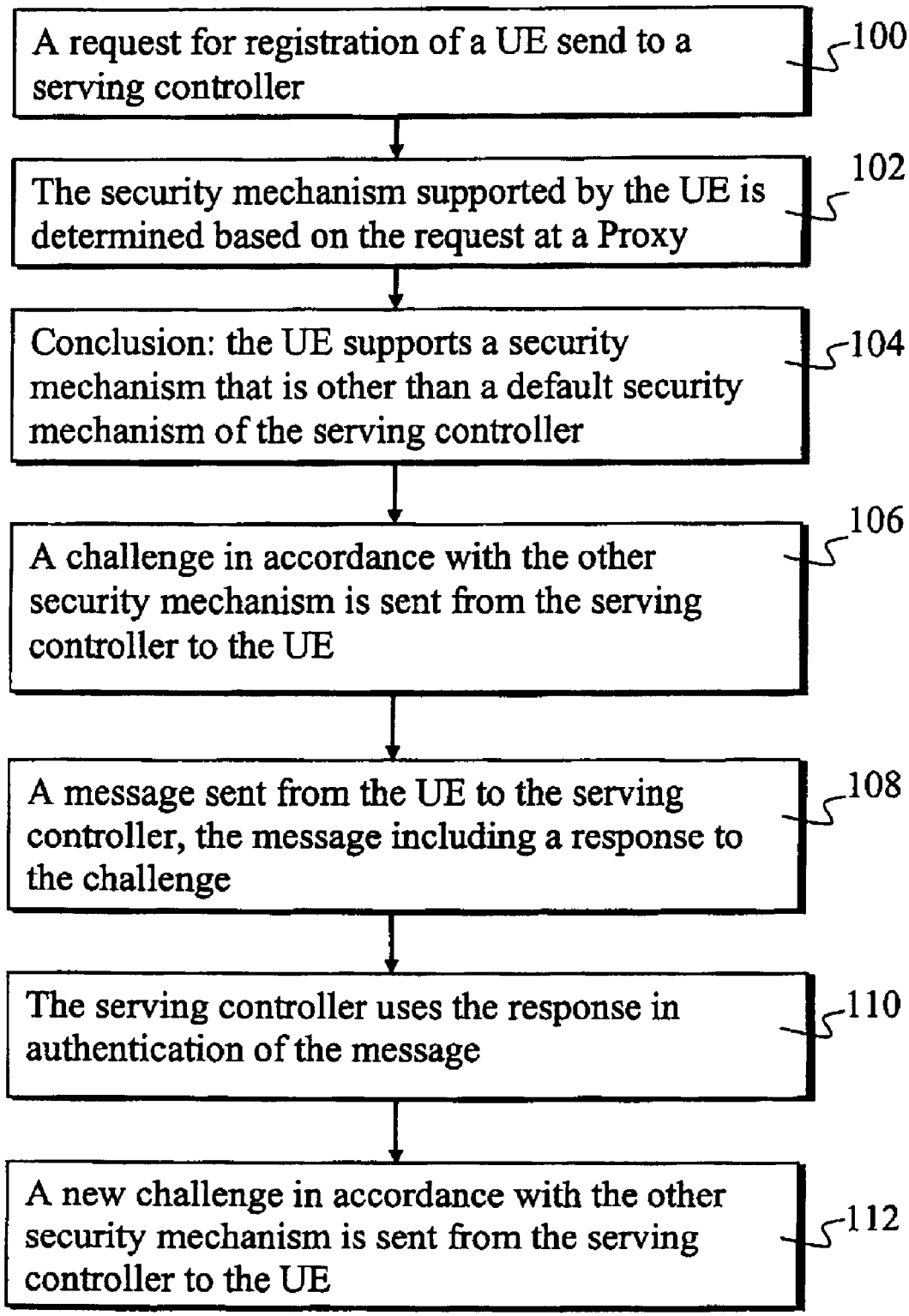
FIG. 2 is a flowchart illustrating the operation of one embodiment of the invention.

Referring now to FIG. 2. In step 100 a user equipment (UE) 30 may initiate the registration process by sending a message comprising a request for registration to a serving controller, for example to the S-CSCF 36 of FIG. 1. The security mechanism the user equipment 30 is configured to support may then be determined based on the request message at step 102.

In a preferred embodiment the determination is performed in another controller, for example at the P-CSCF 35 of FIG. 1. In this embodiment the second or proxy controller 35 may inform the serving controller 36 of the appropriate security mechanism by sending an appropriate indication of the security mechanism that is supported by the user equipment.

If step 102 results to a conclusion (step 104) that another security mechanism than the first security mechanism of the serving controller 36 is supported by the user equipment 30, the serving controller handles the user equipment differently from the default procedure. This procedure includes the step 106 wherein the serving controller 36 sends a challenge in accordance with the other security mechanism to the user equipment 30.

When the user equipment 30 needs to send a further message to the serving controller, for example a further message required by the registration process or a request for a service, it includes at step 108 a response to the challenge in this further message. The serving controller may then authenticate the further message at step 110 based on the response included in the message.

Once the challenge and response thereto is consumed by an authentication of a message, a new challenge is send at step 112 to the user equipment 30. The user equipment 30 then need to respond the new challenge when sending a next message to the serving controller.

The arrangement is preferably such that the serving controller includes a new challenge each time it responds an authenticated request from the user equipment. In the preferred arrangement the next request from the user equipment will then be rejected unless it can be authenticated based on the response to the challenge included in the previous response from the serving controller.

The following will describe in more detail an embodiment wherein the alternative authentication is provided by means of a HTTP Digest based security mechanism.

Figure 3:
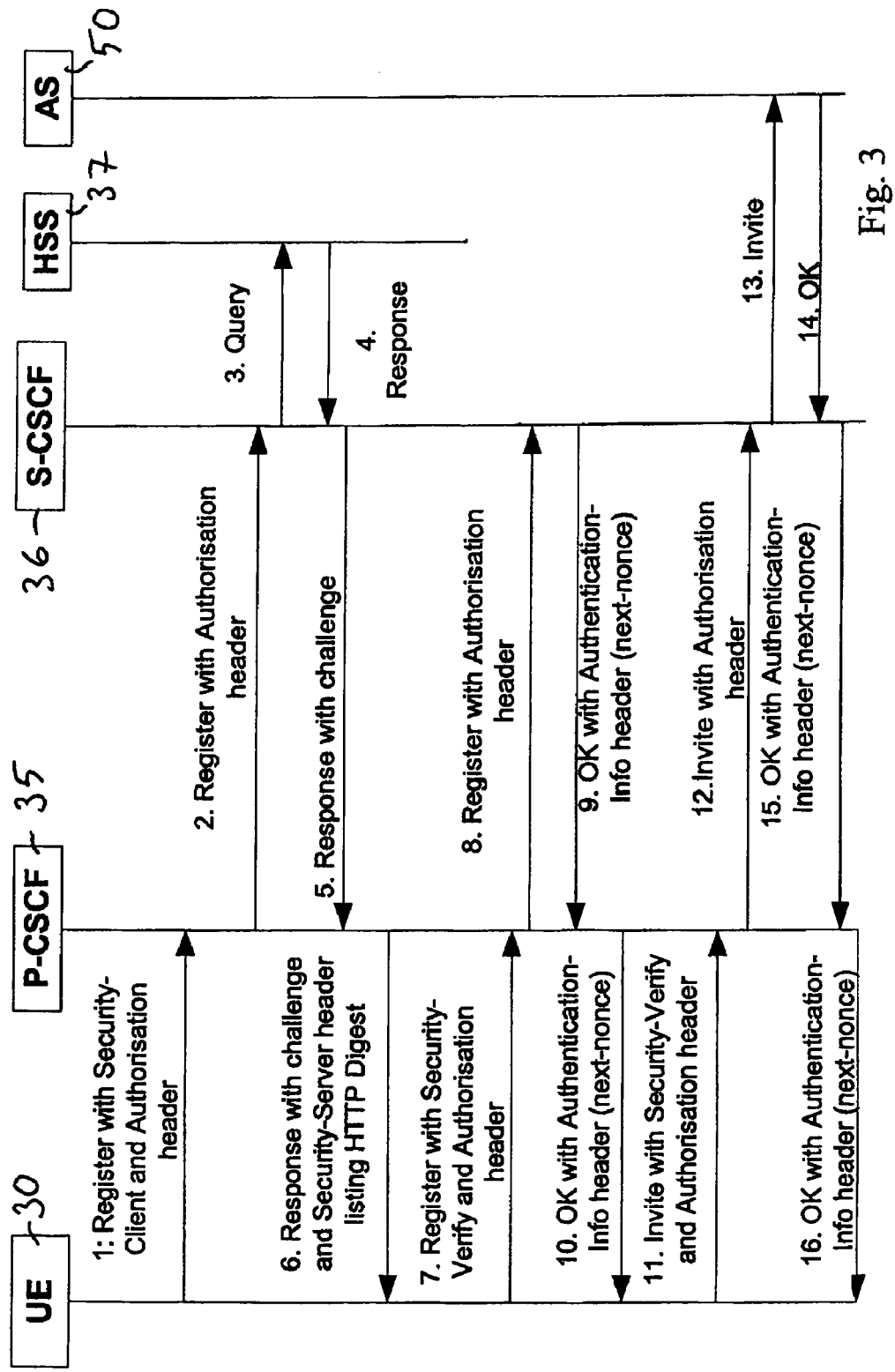
FIG. 3 shows the messaging flow in accordance with an embodiment of the invention.

FIG. 3 shows a signalling flowchart for performing registration to an IMS, and more particularly, to a serving CSCF 36 of the IMS such that the CSCF 36 may authenticate subscribers using the HTTP digest instead of IPSec. This may be required, for example, in the event that a list of the supported security mechanism provided by the user equipment does not contain an indication that IPsec for 3GPP is supported by the user equipment 30.

The challenge may comprise a next-nonce value. The next-nonce value is sent together with a message from the serving controller to the user equipment and can be used to generate digest when another i.e. next message is sent from the user equipment. The serving controller can then authenticate the user equipment based on the response to the next-nonce value send to the user equipment in the previous message. This previous message may be any message send to the user equipment and thus it is not necessary to send a nonce associated with the other message in an explicit challenge message.

The messaging may be based on the session initiation protocol (SIP). SIP was generally developed to allow for initiating a session between two or more endpoints in the Internet by making these endpoints aware of the session semantics. A user connected to a SIP based communication system may communicate with various entities of the communication system based on standardised SIP messages. User equipment or users that run certain applications on the user equipment are registered with the SIP backbone so that an invitation to a particular session can be correctly delivered to these endpoints. To achieve this, SIP provides a registration mechanism for devices and users, and it applies mechanisms such as location servers and registrars to route the session invitations appropriately. Examples of the possible sessions include Internet multimedia conferences, Internet telephone calls, and multimedia distribution.

The mechanism used in 3GPP assumes that the client, when initiating a security agreement mechanism, will send a Security-Client header in the SIP request. The header may then include an indication of the supported security mechanisms.

The user equipment 30 requesting for registration sends message 1 via the IMS system to the P-CSCF 35 to the S-CSCF 36. Message 1 may be a SIP REGISTER request. Before sending message 1, the user equipment 30 includes a Security-Client header in the request. The Security-Client header includes a list that may or may not mention 'ipsec-3gpp'. In addition to that, request 1 may also include an Authorisation header. The Authorisation header may include parameters that are needed for digest-AKA or digest authorization.

Upon receipt of the request, the P-CSCF 35 examines the Security-Client header. If that does not list the 'ipsec-3gpp' mechanism, the P-CSCF 35 concludes that the particular user equipment does not support use of IPsec for 3GPP. If it is determined that the IPsec is not supported, the P-CSCF 35 may signal to the S-CSCF 36 that the particular user equipment will not use ipsec-3gpp.

If nothing else is indicated, this means that there is no integrity protection between the P-CSCF 35 and the user equipment 30. Therefore, if the security-client header indicates that HTTP Digest is supported by the user equipment, and the P-CSCF 35 is aware that the S-CSCF 36 also supports HTTP Digest mechanism, the P-CSCF 35 may remove the Security-Client header from the request and include an indication into the Authorisation header that instead of 'ipsec-3gpp' security mechanism 'HTTP Digest' mechanism needs to be used. For example, an appropriate security parameter that is indicative of the use of the 'HTTP Digest' mechanism may be inserted in the Authorisation header of message 2.

Message 2 i.e. the registration request is then forwarded to the S-CSCF 36. If the S-CSCF 36 detects that message 2 includes indication of the security mechanism such as a 'security: HTTP Digest' parameter in the Authorisation header, the S-CSCF 36 may conclude that there is no security association (SA) between the user equipment 30 and the P-CSCF 35. Thus the S-CSCF 36 may decide that an 'Authentication-Info' header needs to be included in all responses with a next-nonce value in it. This may be required for authentication of the user in association with each request sent by the user. This may be desired since otherwise no other security mechanism might be in place.

FIG. 3 also shows in detail a possibility for operation if the S-CSCF 36 decides that an Authentication-Info header with a 'next-nonce' value needs to be inserted into all responses to an authenticated request. In this scenario the S-CSCF 36 authenticates all requests by the user equipment 30 by checking the response to the challenge sent in an earlier response.

The S-CSCF 36 may obtain the required data for generation of the challenges, such as next-nonce values by querying the HSS 37, see message 3 in FIG. 3. Challenges such as the next-nonce values may be contained in authentication vectors (AVs). Having received the required information in message 4 the S-CSCF 36 may then challenge the user equipment 30 by sending message 5 via the P-CSCF 35 and the IMS including the next-nonce value. Message 5 may be, for example, a 'SIP 401' message.

The P-CSCF 35 may insert a Security-Server header indicative of the use of the HTTP Digest to message 5 before it is sent as message 6 to the user equipment 30.

The user equipment 30 may then send a further message 7 requesting for authentication, for example by means of a SIP REGISTER message. Message 7 may include a Security-Verify header and an authorisation header carrying a response to the challenge received in message 6 from the S-CSCF 36. The P-CSCF 35 may remove the Security-Verify header and then forward the request as message 8 to the S-CSCF 36.

The S-CSCF 36 may then verify if the response in message 8 equals with the expected response. After a positive verification the S-CSCF 36 may send a SIP 200OK message 9 including an Authentication-Info header with a new challenge. In FIG. 3 example this new challenge comprises a next-nonce value. The next-nonce value may be, for example, a new HTTP Digest authentication vector (AV) obtained from the HSS database 37. Message 9 is forwarded from the P-CSCF 35 to the user equipment 30 as message 10. Receipt of message 10 completes the registration procedure.

When a request 11 for a service is sent by the user equipment 30 to the network, it shall include an Authorisation header containing response to the next-nonce value received in message 10. Based on the response the S-CSCF 36 can then authenticate the request 12 without explicitly challenging the user after the receipt of the request. S-CSCF 36 may check the response in the Authorisation header of message 12 against the nonce value send in message 9 to the user equipment 30.

In case of positive authentication, the request is passed further to an appropriate network entity, such as an application server 50 in message 13. When a SIP '200OK' message 14 for the request is received from the application server, the S-CSCF 36 may insert an Authentication-Info header in the message such that message 15 from the S-CFCS 36 contains a new challenge, for example a next-nonce value.

Messages 5 and 9 may contain similar challenges, the only difference being that the value in message 9 is the "next" challenge to that of message 5. An appropriate challenge to be inserted to a message to the user equipment can be obtained each time it is required from the user database. Alternatively, the serving controller may obtain data for a number of challenges by a single query, such as by means of query 3 of FIG. 3 during the registration process.

The above described mechanism may enable a user equipment not supporting IPSec to register to the IMS. It may also allow requests by such user equipment to be authenticated by the S-CSCF. This provides an alternate security solution to the 3GPP standards. Thus user equipment that is not fully compliant with the 3GPP specifications, such as those not supporting IPSec based integrity protection, for example push to talk over cellular (PoC) may also connect to IMS, for example by using HTTP Digest instead.

In addition to the basic authentication, the HTTP Digest provides also some additional features that might be advantageously used in the service applications, and thus some user might prefer the HTTP Digest on the IPsec even if the user equipment supports the latter. For example, the HTTP Digest has features for preventing replay attacks, authenticating every message received from the user equipment (UE), integrity protecting the response to the challenge, and so on.

It should be appreciated that whilst embodiments of the present invention have been described in relation to user equipment such as mobile stations, embodiments of the present invention are applicable to any other type of equipment that needs to be authenticated.

The examples of the invention have been described in the context of an IMS system and GPRS networks. This invention is also applicable to any other access techniques including code division multiple access, frequency division multiple access or time division multiple access as well as any hybrids thereof. Furthermore, the given examples are described in the context of the so called all SIP networks with all SIP entities. This invention is also applicable to any other appropriate communication systems, either wireless or fixed line systems and standards and protocols. Examples of other possible communication systems enabling wireless data communication services, without limiting to these, include third generation mobile communication system such as the Universal Mobile Telecommunication System (UMTS), i-phone or CDMA2000 and the Terrestrial Trunked Radio (TETRA) system, the Enhanced Data rate for GSM Evolution (EDGE) mobile data network. Examples of fixed line systems include the diverse broadband techniques providing Internet access for users in different locations, such as at home and offices. Regardless the standards and protocols used for the communication network, the invention can be applied in all communication networks wherein registration in a network entity is required.

The embodiment of the invention have been discussed in the context of a proxy and servicing call state control functions. Embodiments of the invention can be applicable to other network elements where applicable. In addition or as an alternative to the home subscriber server (HSS) described above, the required authentication information may be obtained from any appropriate database configured to store user specific information.

It is also noted herein that while the above describes exemplifying embodiments of the invention, there are several variations and modifications which may be made to the disclosed solution without departing from the scope of the invention as defined in the appended claims.

The invention claimed is:

1. A method, comprising:
   receiving a request for registration from a user equipment at a serving controller via a second controller, said request for registration including information indicative of at least one protocol supported by the user equipment;
   determining, based on the information, in the second controller that the user equipment supports a second protocol other than a first protocol;
   removing the information from the request for registration in the second controller, including in the request for registration an indication that the second protocol is used by the user equipment and forwarding the request for registration including said indication to the serving controller; and
   sending a challenge in accordance with the second protocol from the serving controller to the user equipment via the second controller.

2. A method as claimed in claim 1, further comprising:
   forwarding a response to the challenge in a message from the user equipment to the serving controller.

3. A method as claimed in claim 2, further comprising:
   using the response for authentication of the message at the serving controller.

4. A method as claimed in claim 1, further comprising:
   receiving at the second controller comprising a network entity providing proxy call state control functions between the user equipment and the serving controller.

5. A method as claimed in claim 1, wherein the sending of the request for registration from the user equipment to the serving controller comprises
   sending a challenge from the serving controller to the user equipment, sending a response to the challenge from the user equipment, and
   registering the user equipment to the serving controller only if a satisfactory response is received from the user equipment, and sending a further challenge to the user equipment after the registration is completed.

6. A method as claimed in claim 1, further comprising:
   obtaining data for sending the challenge from a user information database.

7. A method as claimed in claim 1, wherein the sending of the challenge comprises sending the challenge comprising an authentication vector.

8. A method as claimed in claim 1, further comprising:
   providing the first protocol comprising a protocol in accordance with a secure internet protocol.

9. A method as claimed in claim 1, further comprising:
   providing the second protocol comprising a protocol in accordance with a hypertext transfer digest protocol.

10. A method as claimed in claim 1, further comprising:
    sending of at least the challenge or a response in a message in accordance with a session initiation protocol.

11. A method as claimed in claim 1, further comprising:
    registering the user equipment with a serving controller of an internet multimedia subsystem.

12. A method as claimed in claim 2, wherein said information comprises a list of protocols supported by the user equipment, the method further comprising:
    including in a security-client header of the request for registration the list of protocols supported by the user equipment;
    concluding at the second controller based on the list that the user equipment supports the second protocol instead of the first protocol;

removing the security-client header from the request and including into an authorization header of the request the indication that the second protocol is to be used; and forwarding the request to the serving controller.

13. A method as claimed in claim 1, wherein the sending of the challenge comprises sending the challenge to the user equipment in an authentication information header of a message.

14. A method as claimed in claim 3, further comprising:
providing the message comprising a request for a service provided by an application server.

15. A system, comprising:
a serving controller configured to accept registrations of user equipments and to support at least two different protocols; and
a second controller configured to receive from a user equipment in a request for registration data indicative of at least one protocol that the user equipment supports, to remove said data from the request for registration, to provide the serving controller with information regarding a protocol supported by the user equipment that has requested to be registered to the serving controller, and to forward the request for registration to the serving controller, wherein the serving controller is configured to send a challenge in accordance with a determined protocol to the user equipment and to authenticate a message from the user equipment based on a response to the challenge included in the message.

16. A system as claimed in claim 15, wherein the second controller configured to provide information regarding the protocol is provided in a second controller.

17. A system as claimed in claim 16, wherein the second controller comprises a network entity providing proxy call state control functions between the user equipment and the serving controller.

18. A system as claimed in claim 15, further comprising:
a user information database configured to store data associated with challenges.

19. A system as claimed in claim 15, wherein the serving controller is configured to support a protocol in accordance with a secure internet protocol.

20. A system as claimed in claim 15, wherein the serving controller is configured to support a protocol in accordance with a hypertext transfer digest protocol.

21. A system as claimed in claim 15, the communication system comprising an internet multimedia subsystem.

22. A system as claimed in claim 15, further comprising:
a connection to an application server, wherein a message subjected to authentication by the servicing controller based on the response to the challenge comprises a request for a service provided by the application server.

23. A system as claimed in claim 15, wherein the message subjected to authentication by the servicing controller based on the response to the challenge comprises a request for registration to the serving controller.

24. An apparatus, comprising:
a receiver configured to receive a request for registration from a user equipment for forwarding to a serving controller, said request including data indicative of at least one protocol supported by said user equipment; and
a controller configured to determine based on said data a protocol supported by the user equipment that has requested to be registered to the serving controller, to remove the data from the request for registration in the second controller before forwarding said request to the serving controller, and to signal information to the serving controller regarding the protocol supported by the user equipment.

25. An apparatus, comprising:
receiving means for receiving a request for registration from a user equipment for forwarding to a serving controller, said request including data indicative of at least one protocol supported by said user equipment;
determining means for determining, based on said data, a protocol supported by the user equipment that has requested to be registered to the serving controller;
removing means for removing the data from the request for registration in the second controller before forwarding said request to the serving controller; and
signalling means for signalling information to the serving controller regarding the protocol supported by the user equipment.

26. The apparatus according to claim 24, wherein the controller is further configured to send a response to the challenge from the user equipment to the serving controller.

27. The apparatus according to claim 26, wherein the controller is further configured to use the response for authentication of the message at the serving controller.

28. The apparatus according to claim 24, wherein the controller is comprised in a network entity providing proxy call state control functions between the user equipment and the serving controller.

29. The apparatus according to claim 24, wherein the controller is further configured to send a challenge from the serving controller to the user equipment, to send a response to the challenge from the user equipment, and to register the user equipment to the serving controller only if a satisfactory response is received from the user equipment, and to send a further challenge to the user equipment after the registration is completed.

30. The apparatus according to claim 29, wherein the controller is further configured to obtain data to send the challenge from a user information database.

31. The apparatus according to claim 24, wherein the controller is further configured to send challenge including an authentication vector.

32. A computer program embodied on a computer readable storage medium, the computer program being configured to control a processor to perform:
receiving a request for registration from a user equipment at a serving controller via a second controller, said request for registration including information indicative of at least one protocol supported by the user equipment;
determining, based on the information, in the second controller that the user equipment supports a second protocol other than a first protocol;
removing the information from the request for registration in the second controller, including in the request for registration an indication that the second protocol is used by the user equipment and forwarding the request for registration including said indication to the serving controller; and
sending a challenge in accordance with the second protocol from the serving controller to the user equipment via the second controller.

33. A method, comprising:
receiving a request for registration from a user equipment for forwarding to a serving controller, said request including data indicative of at least one protocol supported by said user equipment;

determining, based on said data, a protocol supported by the user equipment that has requested to be registered to the serving controller;

removing the data from the request for registration in the second controller before forwarding said request to the serving controller; and signaling information to the serving controller regarding the protocol supported by the user equipment.

34. The method according to claim 33, further comprising sending a response to the challenge from the user equipment to the serving controller.

35. The method according to claim 34, further comprising using the response for authentication of the message at the serving controller.

36. The method according to claim 33, wherein the second controller comprises a network entity providing proxy call state control functions between the user equipment and the serving controller.

37. The method according to claim 33, further comprising forwarding a challenge including an authentication vector.

38. A computer program embodied on a computer readable storage medium, the computer program being configured to control a processor to perform:

receiving a request for registration from a user equipment for forwarding to a serving controller, said request including data indicative of at least one protocol supported by said user equipment;

determining, based on said data, a protocol supported by the user equipment that has requested to be registered to the serving controller;

removing the data from the request for registration in the second controller before forwarding said request to the serving controller; and signaling information to the serving controller regarding the protocol supported by the user equipment.

* * * * *